United States Patent [19]

Kobayashi et al.

[11] Patent Number: 5,609,680
[45] Date of Patent: Mar. 11, 1997

[54] CEMENT, CEMENT PRODUCTS, MOLDING MATERIAL, A CONCRETE MEMBER AND A METHOD OF PRODUCING THE SAME

[75] Inventors: Tadashi Kobayashi; Game K. D. Pushpalal, both of Sakata; Masaki Hasegawa, Tokyo, all of Japan

[73] Assignee: Maeta Concrete Industry Ltd., Yamagata, Japan

[21] Appl. No.: 462,004

[22] Filed: Jun. 5, 1995

Related U.S. Application Data

[62] Division of Ser. No. 427,341, Apr. 24, 1995, abandoned, which is a continuation of Ser. No. 129,590, Sep. 30, 1993, abandoned.

[30] Foreign Application Priority Data

Dec. 21, 1992 [JP] Japan ................................. 4-361899
Jun. 28, 1993 [JP] Japan ................................. 5-210815
Jun. 28, 1993 [JP] Japan ................................. 5-210816

[51] Int. Cl.$^6$ .................................................. C04B 24/00
[52] U.S. Cl. .......................... 106/696; 106/724; 106/727; 106/778; 106/790; 106/822; 106/823; 524/3; 524/4; 524/6; 52/726.2
[58] Field of Search .............................. 106/38.2, 38.22, 106/38.24, 38.25, 38.6, 38.7, 38.8, 600, 696, 708, 724, 727, 790, 822, 823, 778; 524/3, 4, 6; 264/333; 52/29.4, 726.1, 726.2

[56] References Cited

U.S. PATENT DOCUMENTS

| 2,328,290 | 8/1943 | Niederreither et al. |
|---|---|---|
| 2,842,120 | 7/1958 | Foglia et al. |
| 2,842,138 | 7/1958 | Billings et al. |
| 3,677,994 | 7/1972 | Wood et al. |
| 3,772,051 | 11/1973 | Shearing .................. 106/727 |
| 3,925,090 | 12/1975 | Head. |
| 3,947,425 | 3/1976 | Freeman et al. |
| 4,172,056 | 10/1979 | Marra. |
| 4,284,433 | 8/1981 | Aignesberger et al. ........ 106/823 |
| 4,391,645 | 7/1983 | Marcellis et al. ............. 106/823 |
| 4,424,074 | 1/1984 | Villa et al. .................. 106/823 |
| 4,622,353 | 11/1986 | Weiss ......................... 106/727 |
| 4,986,854 | 1/1991 | Okuno et al. ................ 106/728 |
| 5,092,935 | 3/1992 | Crema et al. ................ 106/823 |
| 5,233,012 | 8/1993 | Kawamura et al. .......... 106/823 |
| 5,254,228 | 10/1993 | Westhof et al. .............. 106/733 |
| 5,322,562 | 6/1994 | Ellenberger ................. 106/823 |
| 5,348,582 | 9/1994 | Herzig et al. ............... 106/823 |

FOREIGN PATENT DOCUMENTS

| 721548 | 3/1932 | France. |
|---|---|---|
| 1296929 | 5/1962 | France. |
| 2354866 | 1/1978 | France. |
| 3105459 | 9/1982 | Germany. |
| 43431/1984 | 10/1984 | Japan. |
| 206342/1988 | 8/1988 | Japan. |
| 0578276 | 11/1977 | U.S.S.R. ................. 106/727 |
| 260653 | 11/1926 | United Kingdom. |

OTHER PUBLICATIONS

*Organic Chemistry*, 2nd Edition, TW Graham Solomons (1976) pp. 802–807.

*Primary Examiner*—Paul Marcantoni
*Attorney, Agent, or Firm*—Ratner & Prestia

[57] ABSTRACT

Cement comprising hydraulic cement and polymer precursor such as alcohol-soluble phenol resin precursor that is substantially anhydrous and generates water by polymerization.

7 Claims, 2 Drawing Sheets

FIG. 5

CEMENT, CEMENT PRODUCTS, MOLDING MATERIAL, A CONCRETE MEMBER AND A METHOD OF PRODUCING THE SAME

This application is a division of application No. 08/427, 341, filed Apr. 24, 1995, now abandoned, which is a continuation of application Ser. No. 08/129,590, filed Sep. 30, 1993, now abandoned.

BACKGROUND OF THE INVENTION

This invention relates to improvement on cement, products thereof, and molding material to yield higher physical strength, better thermal resistance and water resistance, and a method for producing them.

This invention also relates to an improvement on a concrete member to yield higher physical strength, better thermal resistance and water resistance, and a method of producing the same.

There are known various organic or inorganic compounds available for molding materials, adhesives, laminates and other materials used for various fields such as civil engineering and construction industries, transportation industries of cars or railroads, chemical industries, other general mechanical industries and so on.

Hydraulic cement has been generally used as mortar or concrete mainly in civil engineering and construction industries. The cement is combined with more than 25 weight % of water and aggregate is added thereto to produce cement products. The cement products have low flexural strength of 50 to 100 kgf/cm$^2$ (5 to 10N/mm$^2$) although they have high compressive strength and they conventionally have reinforcing bars used therein. In order to improve the flexural strength of the cement products, there are added short glass fibers or carbon fibers thereto. However, their flexural strength rarely exceeds 400 kgf/cm$^2$ (40N/mm$^2$).

In general, the cement products have higher physical strength as the amount of water used is lowered, and also as the amount of blow-holes included therein is lowered.

For example, Japanese Application Publication No. 43431/1984 discloses cement products having extremely high flexural strength without any fibers included therein and without being molded under high compressive pressure. These cement products can be produced by kneading hydraulic cement, water and water organic polymer with each other while high shearing force is applied thereto by a double roller mill so that sizes and rates of blow-holes in the cement products are limited.

The cement products disclosed in the Japanese Application Publication have higher flexural strength because it is cured by combining hydraulic cement with 7 to 30% of water relative to hydraulic cement. However, the cement products, although having flexural strength improved, disadvantageously have physical strength lowered when they are immersed in water. They also have water resistance lowered due to their swelling when they are immersed in water. The disadvantages are present because of the cement products including water organic polymer.

In order to improve water resistance of the cement products, Japanese Patent Application Laying-Open No. 206342/1988 discloses cement products including an isocyanate compound reacted with the hydrophilic group of the water organic polymer of the aforementioned cement products. Such isocyanate compound may be added to the components of the cement products before they are kneaded or while they are kneaded. Also, they may be impregnated with isocyanate compound after they are kneaded, but before they are cured or after they are cured.

However, such material has a disadvantage during kneading and molding because isocyanate compound is virulent and has a strong irritating smell. Furthermore, urethane derivative which is the main reactant produced by reacting the isocyanate compound with the hydrophilic group disadvantageously has lower thermal resistance.

Formaldehyde has been used also for molding materials, adhesives and laminates. Such molding material including formaldehyde is obtained by combining formaldehyde resin precursor with filler such as wood flour, pulp, diatomaceous earth or the like, curing agent, lubricant, coloring agent and/or other additives, grinding and classifying them. In order to lower fragility of such molding material and improve flexural strength thereof, there has been added thereto filler of fibers such as cotton fibers, flax fibers, glass fibers or the like.

Such molding material is molded by compression molding, transfer molding or injection molding to produce mold goods. Such mold goods have flexural strength of 500 to 1000 kgf/cm$^2$ (50 to 100N/mm$^2$) unless there is used filler of fiber material such as glass fibers or flax fibers.

However, such molding material of formaldehyde cannot have high flexural strength of more than 100N/mm$^2$ without any filler of reinforcing fibers. If reinforcing fibers are added to formaldehyde, then the reinforcing fibers are cut when the molding material is produced and oriented when it is molded. The cutting and orienting of the fibers causes the mold goods to have the physical strength varied and an orientation provided thereto.

In addition, since the molding material has fluidity lowered due to the filled fibers, the molding material disadvantageously fails to pervade all parts of the mold, which prevents the molded products from having a smooth surface.

Conventional concrete members have been manufactured by placing freshly mixed concrete in a mold of steel, wood or FRP provided in factories or working spots. It will be noted that they may be advantageously manufactured by using permanent molds of precast concrete because such permanent molds are integral to the concrete members and not required to be removed. If the permanent mold is formed of concrete having high durability, then the entire concrete members will have durability improved. The concrete members may have reinforcing bars used therein.

However, conventional concrete placed in the mold of steel, wood or FRP has poor wear resistance and water tightness. Furthermore, the concrete members will have durability lowered due to rust of the reinforcing bars. This is caused by chloride permeating the concrete members through fine cracks or honeycombs therein, which are in turn produced due to poor operation of the concrete construction or poor curing of concrete material therefor.

Although the property of concrete itself may be improved by adding admixtures such as fibers or silica fumes to concrete material, such improvement on the entire concrete members is undesirably expensive.

Although the entire concrete members are able to have their durability improved if permanent molds of precast concrete having high durability are used, they still have no flexural strength improved.

Such permanent molds of precast concrete are relatively thicker and heavier, which causes assemblies thereof to be troublesome. Of late, the concrete members are required to be relatively thinner and lighter.

SUMMARY OF THE INVENTION

It is therefore desirable to provide cement having higher flexural strength and better water resistance and better thermal resistance; cement products having higher physical strength, such as flexural strength of more than $40N/mm^2$, higher elastic modulus, and better thermal resistance and better water resistance; molding material including a cement component and having higher physical strength, such as flexural strength of more than $50N/mm^2$ and preferably of more than $100N/mm^2$, higher elastic modulus, and better thermal resistance and better water resistance; an inexpensive concrete member having higher flexural strength and higher durability such as water tightness, chemical resistance and salt damage or weather resistance; and a method of producing a concrete member having higher flexural strength and higher durability such as water tightness, chemical resistance and salt damage or weather resistance.

Accordingly, the present invention provides cement that has at least one kind of hydraulic cement and a polymer precursor that is substantially anhydrous and generates water by a curing reaction.

The polymer precursor may be blended with a ratio of 10 to 60 parts by weight and preferably 12 to 30 parts by weight relative to 100 parts by weight of the hydraulic cement.

The polymer precursor may be formaldehyde resin precursor such as phenol resin precursor, melamine resin precursor or urea resin precursor or polyimide resin precursor.

In accordance with another aspect of the invention, there is provided cement that has at least one kind of hydraulic cement, a polymer precursor that is substantially anhydrous and generates water by a curing reaction, and an additive.

The additive may be polyamide such as fatty alcohol soluble polyamide or polyacrylamide.

Filler such as fiber material may also be added to the cement of the present invention.

When filler is added, the polymer precursor may be blended with the same ratio as aforementioned, but the blend ratio is set while the hydraulic cement has filler included.

In accordance with a further aspect of the invention, there is provided a cement product formed by curing cement that has at least one kind of hydraulic cement and a polymer precursor that is substantially anhydrous and generates water by a curing reaction.

In this aspect, the polymer precursor may be blended with the same ratio as aforementioned and may be added with additive and/or filler.

In accordance with a further aspect of the invention, there is provided a molding material that has at least one kind of hydraulic cement and a polymer precursor that is substantially anhydrous and generates water by a curing reaction.

In this aspect, the polymer precursor may be blended with a ratio of 5 to 100 parts by weight and preferably 7 to 60 parts by weight relative to 100 parts by weight of the hydraulic cement.

Also, in this aspect, the polymer precursor may be formaldehyde resin precursor such as phenol resin precursor, melamine resin precursor or urea resin precursor, but may be polyimide precursor. It should be noted that the blend ratio of polymer precursor is set while it has no alcohol solvent included.

In accordance with a further aspect of the invention, there is provided a method of producing molding material by mixing composite including at least one kind of hydraulic cement and a polymer precursor that is substantially anhydrous and generates water by a curing reaction, where the composite being in the form of powder.

In accordance with a further aspect of the invention, there is provided a method of producing molding material by mixing composite including at least one kind of hydraulic cement and a polymer precursor that is substantially anhydrous and generates water by a curing reaction, where the polymer precursor is in a thermal molten form.

In accordance with a further aspect of the invention, there is provided a method of producing molding material by mixing composite including at least one kind of hydraulic cement and a polymer precursor that is substantially anhydrous and generates water by a curing reaction, where the polymer precursor is in the thermal molten form and the composite is ground and classified.

In accordance with a further aspect of the invention, there is provided a method of producing molding material by mixing composite including at least one kind of hydraulic cement and polymer precursor that is substantially anhydrous and generates water by curing reaction, the polymer precursor being in the form of alcohol solution of the polymer precursor.

In accordance with a further aspect of the invention, there is provided a method of producing molding material by mixing composite including at least one kind of hydraulic cement and polymer precursor that is substantially anhydrous and generates water by curing reaction, the polymer precursor being in the form of alcohol solution of the polymer precursor and the composite being ground and classified after the alcohol is evaporated.

In these aspects of producing molding material, the polymer precursor may be blended with a ratio of 5 to 100 parts by weight and preferably 7 to 60 parts by weight relative to 100 parts by weight of the hydraulic cement.

Also, in these aspects, the polymer precursor may be formaldehyde resin precursor such as phenol resin precursor, melamine resin precursor or urea resin precursor, but may be polyimide precursor. It should be noted that the blend ratio of polymer precursor is set while it has no alcohol solvent included.

In accordance with another aspect of the invention, there are provided molded products obtained by molding, heating and curing molding material comprising composite including at least one kind of hydraulic cement and a polymer precursor that is substantially anhydrous and generates water by curing reaction.

In this aspect, the composite may be in the form of powder. It may be in a thermally molten form of polymer precursor or in the thermally molten form of polymer precursor and ground and classified.

Alternatively, it may be in a form of alcohol solution of polymer precursor or in the form of alcohol solution of polymer precursor and ground and classified.

Also, in this aspect, the polymer precursor may be blended with a ratio of 5 to 100 parts by weight and preferably 7 to 60 parts by weight relative to 100 parts by weight of the hydraulic cement.

Furthermore, in this aspect, the polymer precursor may be formaldehyde resin precursor such as phenol resin precursor, melamine resin precursor or urea resin precursor, but may be polyimide precursor. It should be noted that the blend ratio of polymer precursor is set while it has no alcohol solvent included.

In accordance with another aspect of the invention, there is provided a concrete member comprising a concrete body and at least one reinforcing body integrally provided with the concrete body, the reinforcing body including at least one kind of hydraulic cement and polymer precursor that is substantially anhydrous and generates water by curing reaction.

In this aspect, the reinforcing body may be attached to the concrete body or buried in the concrete body.

Also, in this aspect, the polymer precursor may be blended with a ratio of 5 to 100 weight parts relative to 100 weight parts of the hydraulic cement.

Furthermore, in this aspect, the polymer precursor may be formaldehyde resin precursor such as phenol resin precursor, melamine resin precursor or urea resin precursor, but may be polyimide precursor. It should be noted that the blend ratio of polymer precursor is set while it has no alcohol solvent included.

In accordance with a further aspect of the invention, there is provided a method of producing a concrete member by forming at least one reinforcing body including at least one kind of hydraulic cement and polymer precursor that is substantially anhydrous and generates water by curing reaction, placing the reinforcing body in a mold, and placing and curing freshly mixed concrete in the mold to form the concrete member with the reinforcing body integrally provided.

In accordance with a further aspect of the invention, there is provided a method of producing a concrete member by forming at least one reinforcing body including at least one kind of hydraulic cement and polymer precursor that is substantially anhydrous and generates water by curing reaction; assembling a permanent mold of the reinforcing body; and placing and curing freshly mixed concrete in the permanent mold to form the concrete member with the reinforcing body integrally provided.

In accordance with a further aspect of the invention, there is provided a method of producing a concrete member by forming a concrete body; forming at least one reinforcing body including at least one kind of hydraulic cement and polymer precursor that is substantially anhydrous and generates water by a curing reaction; adhering the reinforcing body to the concrete body by adhesive to form the concrete member.

In these aspects of producing a concrete member, the polymer precursor may be blended with a ratio of 5 to 100 weight parts relative to 100 weight parts of the hydraulic cement.

Furthermore, in these aspects, the polymer precursor may be formaldehyde resin precursor such as phenol resin precursor, melamine resin precursor or urea resin precursor, but may be polyimide precursor.

BRIEF DESCRIPTION OF THE DRAWINGS

The above and other objects and features of the invention will be apparent from the description of the embodiments of the invention and the accompanying drawings.

DETAILED DESCRIPTION OF THE EMBODIMENT

The invention provides cement comprising at least one kind of hydraulic cement and a polymer precursor that is substantially anhydrous and generates water by a curing reaction.

As the cement comprises a polymer precursor that is substantially anhydrous and generates water by a curing reaction, water generated by the curing reaction hydrates with the hydraulic cement. This causes higher physical strength such as flexural strength and better water resistance and thermal resistance of the composite material.

Hydraulic cement used in the invention may be conventional cement such as Portland cement (normal Portland cement, high early strength Portland cement or moderate Portland cement, for example), blended cement (Portland blast furnace cement, silica cement or fly-ash cement, for example), special cement (aluminous cement or oil well cement, for example) and various gypsum. One or more kinds of hydraulic cement can be used.

The polymer precursor that generates water when cured may be suitably formaldehyde resin precursor or polyimide precursor. The precursor may have a predetermined viscosity adjusted by solvent in view of molding thereafter.

The formaldehyde precursor may be a phenol resin precursor, melamine resin precursor or urea resin precursor, preferably in the form of alcohol solution with a nonvolatile component of 40 to 70%. Alcohol which may be used in this invention is methanol, ethanol, propanol, butanol, cyclohexanol, phenol, cresol, ethylene glycol, trimethylene glycol or the like.

The polyimide precursor may be preferably in the form of solution for which a solvent of N-methyl-2-pyrrolidone or N,N-dimethyl acetamide or the like is used with a nonvolatile component of 10 to 30% included therein.

Polymer precursor in the form of solution and hydraulic cement are blended with a blending ratio of 10 to 60 weight parts of polymer precursor to 100 weight parts of hydraulic cement. Preferable blend ratio is of 12 to 30 weight parts of polymer precursor. If hydraulic cement has filler added, then the blend ratio of polymer precursor is to 100 weight parts of powder components of hydraulic cement having the filler added.

If the blend ratio of polymer precursor is less than 8 weight parts, then it will not be able to be positively blended with hydraulic cement. This also causes the resultant product to have lower physical strength.

If the blend ratio of polymer precursor is more than 60 weight parts, the resultant product has cracks and physical strength is not optimized. Therefore, it will be noted that more than 60 weight parts of polymer precursor is not economical.

There may be blended additive or filler with composite material of polymer precursor and hydraulic cement, if necessary. Such additive or filler may be blended by a conventional mixer such as an Eirich type mixer or a helical mixer. If the blend ratio of polymer precursor is relatively small, it may be preferably blended by a mixer providing a compression function, shearing function or spatula touching function. Such a mixer may be a kneader, a wet pan mill, a helical rotor, a roller mill, a Banbury type mixer or the like.

The kneaded cement composite material is molded by roller molding, extruder molding, press molding or pouring molding. The polymer precursor of the cement composite material is then heated and cured to form a cement product having a predetermined configuration and size.

Composite material including formaldehyde precursor may be heated at a temperature of 100° to 300° C. and preferably at a temperature of 150° to 250° C. Composite material including polyimide precursor may be heated at a temperature of 300° to 500° C. and preferably at a temperature of 350° to 450° C. Heating composite material cures polymer precursor and generates water, whereby hydraulic cement hydrates so that the cement product has higher physical strength.

In general, formaldehyde precursor is rapidly cured in an acid area of less than pH 7, but it will be able to be fully cured even in an alkali area of more than pH 7 if it is heated at a temperature of 150° to 250° C. for a relatively longer time.

It is known that such curing reaction of formaldehyde precursor is made mainly by the following model condensation reaction:

The thus generated water hydrates hydraulic cement under heat to produce a cement hydrate.

It is known that polyimide precursor becomes an insoluble and infusible solid of excellent thermal resistance when it is heated at a temperature of more than 300° C. through an intramolecular cyclodehydration reaction.

An example of a typical curing reaction of polyimide precursor that produces polyimide of excellent thermal resistance in accordance with intramolecular cyclodehydration reaction of polyamic acid having pyrromerit acid skeleton follows:

Water generated by imide reaction of polyimide precursor hydrates hydraulic cement under heat in the same manner as water generated by curing reaction of formaldehyde precursor to produce a cement hydrate.

A cement product has texture formed by the rigid three-dimensional bridge structure of formaldehyde resin or polyimide and cement hydrate involved with each other, which causes the product to have higher physical strength.

Although cement formed in the aforementioned manner has higher flexural strength provided thereto by heating, it has been found that some of the cement products of the invention have higher physical strength provided thereto by immersing in water after curing by heating.

Although the cement of the invention has no water particularly required on kneading, it may be blended with small quantity of water in consideration of premolding. Furthermore, there may be added thereto an additive such as glycerol, glycerol triacetate, polyethylene glycol, furfural, dibutyl phthalate, phthalic anhydride, stearic acid, rosin, polyamide, polyacrylamide, polyvinyl alcohol or the like.

Particularly, polyamide, polyacrylamide or polyvinyl alcohol is a preferable additive for improvement of the cement product. The additive may be added directly to the polymer precursor and then dissolved or dispersed therein, but it may be dissolved or dispersed in solvent such as ethanol, methanol or N,N-dimethylacetamide and then added to polymer precursor.

A blend ratio of the additive may be generally of 0.5 to 20 weight parts to 100 weight parts of polymer precursor and preferably 2 to 12 weight parts thereto.

Polyamide used in the invention is preferably alcohol-soluble. Such alcohol-soluble polyamide may be amide bonding—CONH—having at least a part of hydrogen substituted by methoxymethyl group, or amide bonding—CON(R) produced from a secondary amine. Such polyamide added to the polymer precursor reacts with the polymer precursor during heating and curing in the manner corresponding to that in which formaldehyde resin precursor or polyimide precursor reacts through intramolecular cyclodehydration under heat.

Furthermore, cement composite material of the invention may be blended with filler when kneaded, if necessary. A blend ratio of filler may be determined in view of formability of composite material and physical strength of the obtained product. Filler may be of conventional sand, light-weight aggregate, wood flour, ground calcium carbonate, aluminium hydroxide which may be used as incombustible agent for plastic or rubber, inorganic pigment or the like.

In order to further improve the physical strength of the cement products of the invention, there may be used hydraulic cement having particle size distribution adjusted in multiple mode. Hot press curing the cement products under pressure to adjust blow-holes thereof may also be used.

In order to improve adhesion of filler and/or hydraulic cement to resin, there may be added conventional silane coupling agent thereto. Such silane coupling agent may be γ-aminopropyl triethoxysilane, γ-ureidopropyl triethoxysilane or γ-grycidoxypropyl trimethoxysilane.

Some examples of the invention and some comparisons will be described hereinafter.

EXAMPLES 1 to 3

There were kneaded 100 weight parts of hydraulic cement which was formed of normal Portland cement, alumina cement (tradename DENKA Alumina Cement No. 1 manufactured by Denki Kagaku Kogyo Kabushiki Kaisya, Japan) or blend thereof, 23 weight parts of alcohol-soluble phenol resin precursor (tradename Shonol manufactured by Showa Highpolymer Co., Ltd., Japan) and 2.3 weight parts of glycerol in a mortar mixer for 6 minutes. The thus kneaded mixture passed through a pair of rollers, used as a knoodle maker and having a revolution ratio identical to each other, about 20 times to form a sheet-like strip of 1.5 mm thickness. This was divided into sheet-like articles of about 25 mm width and 75 mm length. 10 sheet-like products were heated and cured at a temperature of 150° C. for 18 hours to make cement products.

5 cement products thereof were provided directly for bending tests while the remaining 5 cement products were provided for bending tests after they were immersed in water of 20° C. for three days. The bending tests were made in accordance with JIS (Japanese Industrial Standard) R 5021 with a distance of 50 mm between supporting points where the cement products were supported. Table I shows the results of the bending tests. The flexural strengths of the cement products were measured immediately after they were heated at a temperature of 150° C. (referred to as direct test in Table I) or immersed in water.

TABLE I

|  | COMPOSITION | | |
| --- | --- | --- | --- |
|  | Ex 1 | Ex 2 | Ex 3 |
| normal Portland cement | 100 | 60 | 0 |
| alumina cement | 0 | 40 | 100 |
| phenol resin precursor | 23 | 23 | 23 |
| glycerol | 2.3 | 2.3 | 2.3 |
| flexural strength (Kgf/cm$^2$) | | | |
| direct test | 466 | 545 | 572 |
| after immersion in water | 460 | 581 | 599 |

EXAMPLE 4

There were kneaded 100 weight parts of alumina cement (tradename DENKA Alumina Cement No. 1 manufactured by Denki Kagaku Kogyo Kabushiki Kaisya, Japan) or blend thereof, 15 weight parts of alcohol-soluble phenol resin precursor (tradename Shonol manufactured by Showa Highpolymer Co., Ltd., Japan) and 1.5 weight parts of glycerol in a bench type kneader for 6 minutes. The thus kneaded mixture was molded in a pushing mold under pressure of 150 kgf/cm$^2$ to form cement products of 10 mm thickness, 40 mm width and 160 mm length. The cement products were heated and cured at a temperature of 150° C. for 18 hours to make cement products.

5 cement products thereof were provided directly for bending tests. The bending tests were made in accordance with JIS R 5021 with a distance of 100 mm between supporting points where the cement products were supported. The resultant flexural strengths of them were 529 kgf/cm$^2$.

EXAMPLE 5

The same materials as in Example 4 were used. 100 weight parts of alumina cement, 20 weight parts of alcohol-soluble phenol resin precursor and 1.8 weight parts of glycerol were kneaded in a bench type kneader for 6 minutes. The thus kneaded mixture was molded in a vacuum extruding molding machine to form cement products of 15 mm thickness, 20 mm width and 160 mm length. The cement products were cured and provided for bending tests in the same manner as in EXAMPLE 4. The resultant flexural strengths of them were 551 kgf/cm$^2$.

EXAMPLES 6 to 10

Cement products were manufactured in the same manner as in Examples 1 to 3 except for fillers of N-methoxymethylpolyamide having hydrogen of amide bonding substituted by methoxymethyl group by about 30% (tradename Toresin manufactured by Teikoku Chemical Industries Co., Ltd., Japan) and ethanol additionally used and blend ratios thereof set as indicated in Table II. The cement products were provided for bending tests in the same manner as in Examples 1 to 3. The results of the tests were Table II.

TABLE II

|  | COMPOSITION | | | | |
| --- | --- | --- | --- | --- | --- |
|  | Ex 6 | Ex 7 | Ex 8 | Ex 9 | Ex 10 |
| normal Portland cement | 100 | 40 | 40 | 0 | 0 |
| alumina cement | 0 | 60 | 60 | 100 | 100 |
| phenol resin precursor | 21.6 | 23 | 20 | 21.6 | 13.6 |
| polyamide | 1.4 | 0.8 | 0.8 | 1.4 | 1.4 |
| ethanol | 0 | 0 | 3.2 | 0 | 8.0 |
| glycerol | 2.3 | 2.3 | 2.0 | 2.3 | 2.3 |
| flexural strength (Kgf/cm$^2$) | | | | | |
| direct test | 584 | 713 | 628 | 762 | 357 |
| after immersion in water | 561 | 720 | 640 | 785 | 378 |

EXAMPLES 11 to 13

Cement products were manufactured in the same manner as in Examples 1 to 3 except for fillers of polyacryl amide (tradename Acoflock N100S manufactured by Mitsui Sianamiddo Co., Ltd., Japan) or polyvinylalcohol (tradename Gosenol manufactured by Nippon Gosei Kagaku Kogyo Kabushiki Kaisya, Japan) in addition to N-methoxymethylpolyamide (tradename Toresin manufactured by Teikoku Kagaku Kogyo Kabushiki Kaisya, Japan) of Examples 6 to 10 additionally used and blend ratios thereof set as indicated in Table III. The cement products were provided for bending tests in accordance with JIS R 5021 with a distance of 50 mm between supporting points where the cement products were supported. The results of the tests were Table III.

TABLE III

|  | COMPOSITION | | |
| --- | --- | --- | --- |
|  | Ex 11 | Ex 12 | Ex 13 |
| alumina cement | 100 | 100 | 100 |
| phenol resin precursor | 21.6 | 21.6 | 21.6 |
| polyamide | 1.4 | — | — |
| polyacrylamide | — | 1.4 | — |
| polyvinylalcohol | — | — | 1.4 |
| glycerol | 2.3 | 2.3 | 2.3 |
| flexural strength (Kgf/cm$^2$) | | | |
| direct test | 1160 | 1320 | 650 |

EXAMPLE 14

There were kneaded 100 weight parts of alumina cement (tradename DENKA Alumina Cement No. 1 manufactured by DENKI Kagaku Kogyo Kabushiki Kaisya, Japan) and 20 weight parts of polyimide precursor (tradename U-varnish-A manufactured by Ube Kosan Co., Ltd., Japan) and molded in the same manner as in Examples 1 to 3. The thus kneaded mixture was heated and cured at a temperature of 120° C. for one hour, at 150° C. for 20 minutes, at 200° C. for 20 minutes, at 250° C. for 20 minutes and finally at 350° C. for one hour to form cement products.

The cement products were provided directly for bending tests. The bending tests were made in accordance with JIS R 5021 with a distance of 50 mm between supporting points where the cement products were supported. The resultant flexural strengths of them were 402 kgf/cm$^2$.

EXAMPLES 15 to 18

The cement products obtained in the same manner as in Examples 6 and 9 were heated at a temperature of 200° C. for 18 hours or at 300° C. of 6 hours.

The cement products were provided for bending tests in the same manner as in Examples 1 to 3. In the tests, the flexural strengths of the cement products were measured before heated, after heated and after immersed in water in order to compare them. The results of the tests are indicated in Table IV.

TABLE IV

|  | Ex 15 | Ex 16 | Ex 17 | Ex 18 |
| --- | --- | --- | --- | --- |
| kind of cement | normal Portland cement | | alumina cement | |
| heating temp. (°C.) | 200 | 300 | 200 | 300 |
| flexural strength (kgf/cm$^2$) | | | | |
| before heated | 584 | 584 | 762 | 762 |
| after heated | 713 | 792 | 1040 | 1120 |
| after immersed in water | 706 | 785 | 1060 | 1220 |

COMPARISONS 1 and 2

The cement products of about 4 mm thickness having high flexural strength commercially available from a certain Japanese Company were divided into 9 pieces, three of which were provided for bending tests.

In order to determine thermal resistance of the cement products, each three remaining pieces were heated at a temperature of 200° C. for 18 hours and at a temperature of 300° C. for 6 hours, respectively and then provided for bending tests.

The bending tests were made in accordance with JIS R 5021 with a distance of 50 mm between supporting points where the cement products were supported. The results of the bending tests were indicated in Table V.

TABLE V

|  | COMPARISON 1 | COMPARISON 2 |
| --- | --- | --- |
| heating temp. (°C.) | 200 | 300 |
| flexural strength (kgf/cm$^2$) | | |
| before heated | 1390 | 1390 |
| After heated | 462 | 330 |

It will be noted that the cement products of Examples 1 to 18 of the invention had higher flexural strength and better thermal resistance and water resistance in comparison with the cement products of Comparisons 1 and 2.

This invention further provides molding material comprising at least one kind of hydraulic cement, a polymer precursor that is substantially anhydrous and generates water by curing reaction, and additives and/or fillers, if necessary. The molding material has no water substantially added thereto.

The molding material of the invention has flexural strength of more than 50N/mm$^2$ and in some examples has flexural strength of more than 100N/mm$^2$ even though it has no reinforcing fibers filled therein.

The molding material may be produced by mixing the composite material in a thermally molten form and thereafter grinding and classifying the same.

Otherwise, the molding material may be produced by mixing the composite material in the form of an alcohol solution of the polymer precursor and thereafter grinding and classifying it with or without alcohol evaporated.

The polymer precursor used is preferably formaldehyde resin precursor, but it may be polyimide precursor. The formaldehyde precursor may be a phenol resin precursor, melamine resin precursor or urea resin precursor, being substantially anhydrous and generating water by heating and curing. This means that the precursor potentially includes water. In this invention, "Substantially anhydrous" means that water content of the polymer precursor is less than 5%, preferably less than 4% and most preferably less than 2% relative to the weight of hydraulic cement. The water content may be measured by Karl-Fischer Method (Analytical Chemistry Manual issued by Association of Japan Analytical Chemistry in 1971, pages 31 and 32). If the water content of the polymer precursor exceeds 5%, then the hydraulic cement will be cured or weathered during manufacturing or storing the molding material, which causes the physical strength of the mold goods to be lowered.

The hydraulic cement to be used in the molding material of the invention may be conventional cement such as Portland cement, blended cement, special cement and various gypsum which may be identical to those used in the cement composite material of the invention aforementioned. One or more kinds of hydraulic cement can be used. The hydraulic cement may be used as commercially available, but it has particle distribution adjusted in multi mode or particle configuration rounded in order to improve the physical strength or fluidity of the molding material.

The formaldehyde precursor used in the molding material of the invention may be blended with hydraulic cement in accordance with moldability and other properties of the mold goods. In general, a blend ratio of formaldehyde precursor may be 5 to 100 weight parts and preferably 7 to 60 weight parts to 100 weight parts of hydraulic cement. If the blend ratio of formaldehyde precursor is less than 5 weight parts, then the blended condition of the components and the fluidity of the molding material is lowered and the mold goods have defects produced therein. If it is more than 100 weight parts, then the mold goods disadvantageously have cracks found therein and physical strength is not optimized. The blend ratio of formaldehyde resin precursor is set while it has no alcohol included therein.

The molding material of the invention is preferably blended with an additive of polymer having acid amide bonding such as polyamide or polyacryl, for example, in order to improve the properties of the mold goods.

In general, a blend ratio of the additive may be 0.5 to 30 weight parts and preferably 2 to 20 weight parts relative to 100 weight parts of formaldehyde precursor. If it is less than 0.5 weight parts, then there appears no improvement in the properties of the mold goods. Also, if it is more than 30 weight parts, there is not an economical increase in the properties of the mold goods.

The additive is preferably finely ground before blended. When it is to be blended using alcohol, the polyamide is preferably alcohol-soluble. Such alcohol-soluble polyamide may be amide bonding—CONH—having at least a part of hydrogen substituted by methoxymethyl group, or amide bonding—CON(R)—produced from a secondary amine.

The molding material of the invention may be blended with other additives such as conventional lubricant, silane coupling agent or coloring agent in addition to the aforementioned polyamide. The lubricant may be formed of glycerol, glycerol triacetate, phthalic anhydride, furfural, alkyl phenol, zinc stearate, magnesium stearate, rosin or the like. The silane coupling agent may be γ-aminopropyl triethoxysilane, γ-ureidopropyl triethoxysilane or γ-grycidoxypropyl triethoxysilane. The coloring agent may be formed of organic or inorganic pigment such as aniline black, carbon black or titanium oxide.

Furthermore, the molding material of the invention may be blended with filler. Such filler may be a conventional one such as wood flour, pulp, cotton flock, stone dust, ground calcium carbonate, aluminium hydroxide, sand, light-weight aggregate, glass fibers, carbon fibers or the like. The polymer precursor may have the blend ratio thereof increased as the amount of the filler increases.

A method for manufacturing the molding material of the invention will now be described.

Formaldehyde precursor, hydraulic cement and additive are blended so as to uniformly disperse their components to form the molding material of the invention. They may be blended by a conventional mixing machine such as a mortar mixer, a kneader, a blender or a roller machine. The proper mixing machine may be preferably selected in accordance with the blend ratio of the components as described below.

A first mixing system is one in which the components in the form of powder may be mixed at the normal temperature by a conventional cold mixing machine such as a kneader, a mortar mixer or a blender. The components may be finely ground or dispersed in a small quantity of solvent such as methanol or ethanol in order to effectively prevent the components from being scattered. The mixture in the form of powder may be dried, if necessary, to obtain the molding material.

A second mixing system is one in which the components in the molten form are thermally mixed by a conventional thermal mixing machine such as a Banbury type mixer, a kneader or a hot roller machine, which is heated by a steam heater or an electric heater. A temperature at which the components are heated is so set that the formaldehyde precursor is fully molten, but no reaction converting it to methylene significantly progresses. In general, the preferable temperature is 80° to 150° C. If it exceeds 150° C., the formaldehyde precursor is cured too much before the components are fully mixed.

The mixture which is obtained by thermally mixing the components is dried, ground and classified to form the molding material. Alternatively, the mixture which is obtained by thermally mixing the components is used as the molding material without grinding and classifying because of a molding method and/or product configuration in manufacturing the mold goods.

A third mixing system is one in which the components in the form of alcohol solution of formaldehyde precursor may be mixed by a conventional mixing machine such as a kneader, a Banbury type mixer, a mortar mixer or a two-roller machine.

In general, this mixing is made at the normal temperature, but it may be made while alcohol is heated nearly at its boiling temperature in order to enhance an evaporation of alcohol if the components are fully dispersed in alcohol.

Formaldehyde precursor used for the molding material is alcohol-soluble and it is used in an alcohol solution. A quantity of alcohol used therefor may be determined in view of the dispersion effect of the components and moldability of the molding material. Preferably, it may be an alcohol solution having 20 to 80% nonvolatile component.

The alcohol which is used in the molding material of this invention may be methanol, ethanol, propanol, butanol, cyclohexanol, phenol, cresol, ethylene glycol, trimethylene glycol or the like.

The mixture which is obtained by mixing the components is dried to evaporate the alcohol, if necessary, and then ground and classified to form the molding material. Alternatively, the mixture which is obtained by mixing the components is used as the molding material without grinding and classifying because of a molding method and/or product configuration in manufacturing the mold goods.

The thus obtained molding material may be molded by compression molding, transfer molding, injection molding, extrusion molding, flowing-in molding (pouring molding) or the like and heated during or after molding to form the mold goods. A heating temperature may be 100° to 300° C. and preferably 150° to 250° C. The heat cures the formaldehyde resin precursor and generates water, which causes the hydraulic cement to hydrate to yield higher physical strength. This higher physical strength results from aluminium ion ion-bridging with resin, which is caused by a small quantity of water generated therein.

Although, in the aforementioned, formaldehyde resin precursor is used as the polymer precursor, it should be understood that polyimide precursor may be used as the polymer precursor.

The molded products manufactured by the invention may be applied for various uses. They may be used for transportation fields such as bodies, ship parts, pallets or the likes, electronic or electric fields such as instrument housings, insulation parts, IC sealers, parabola antennas, printed circuit boards, floors for office automation devices or the like, public engineering or construction fields such as concrete reinforcing materials, concrete molds, composite molds such as superstrong composite molds, paving materials, tiles, water tanks, roofing material (roofing tile, roofing slate and others), inner or outer wall materials, ceiling materials, partition wall materials, columns for road, capsule houses, light-weight manholes, artificial marble products such as kitchen counters or washing stands or the like, chemical industry fields such as tanks, pipes, pipe covering or the like and general machine fields such as gears or the like.

Some examples of the molding materials of the invention and one comparison will now be described.

EXAMPLES 19 and 20

There were blended and mixed alumina cement (tradename DENKA Alumina Cement No. 1 manufactured by Denki Kagaku Kogyo Kabushiki Kaisya, Japan) phenol resin precursor (tradename Shonol BRG-558 manufactured by Showa Highpolymer Co., Ltd., Japan), hexamethylene tetramine, zinc stearate, furfural and coloring agent (tradename BAYERTITAN manufactured by Bayer Japan Co., Ltd., Japan) by a roller mill for rubber which was heated at a temperature of 110° C. by steam. A revolution ratio of rollers was set at 1 to 1.3. The water content of phenol resin precursor measured by Karl-Fischer method was 0.1%.

Dough mixture which was wound on the rollers of the roller mill was removed from the rollers and ground in a stainless steel mortar to form the molding material. The molding material was filled in a die having 120° C. maintained and compressively molded under 10 N/mm². Thereafter, the die temperature was raised to 180° C. and maintained at this temperature for 6 hours to form sheet-like mold goods of about 3 mm thickness.

The sheet-like mold good was divided into 10 pieces of 15 mm width and 80 mm length. 5 pieces thereof were provided directly for bending tests while remaining 5 pieces were provided for bending tests after they were immersed in water of 20° C. for seven days. The bending tests were made by a bisecting point loading method with a distance of 60 mm between supporting points where the pieces were supported. Flexural elastic modulus was determined by measuring flexure at the middle of the tested pieces.

The composition of Examples 19 and 20 are indicated at Table VI-I and the results of the tests are shown in Table VI-II.

TABLE VI-I

|  | Composition | | |
| --- | --- | --- | --- |
|  | Ex 19 | Ex 20 | Ex 21 |
| alumina cement | 100 | 100 | 100 |
| phenol resin precursor | 25.0 | 16.6 | 22.0 |
|  | (BRG-558) | (BRG-558) | (BKM-2620) |
| hexamethylene-tetramine | 2.50 | 1.66 | — |
| zinc stearate | 0.50 | 0.33 | 0.22 |
| furfural | — | 1.60 | — |
| coloring agent | 3.00 | — | — |

TABLE VI-II

|  | Ex 19 | Ex 20 | Ex 21 |
| --- | --- | --- | --- |
| flexural strength (N/mm$^2$) | | | |
| before immersion in water | 130 | 102 | 58.0 |
| after immersion in water | 153 | 105 | not measured |
| flexural elastic modulus (kN/mm$^2$) | | | |
| before immersion in water | 33.8 | 35.3 | not measured |
| after immersion in water | 33.1 | 35.1 | not measured |
| water absorption rate after immersion in water % | | | |
|  | 0.19 | 0.21 | not measured |

EXAMPLE 21

There were ground in a stainless steel mortar alumina cement (tradename DENKA Alumina Cement No. 1 manufactured by Denki Kagaku Kogyo Kabushiki Kaisya, Japan) and phenol resin precursor (tradename Shonol BKM-2620 manufactured by Showa Highpolymer Co., Ltd., Japan) and added thereto zinc stearate in the form of powder in a mortar mixer for four minutes to form molding materials. The water content of phenol resin precursor measured by Karl-Fischer method was 4.5%. The molding materials were molded to form testing pieces in the same manner as in Examples 19 and 20.

The composition of Example 21 is indicated in Table VI-I and the result of the test is shown in Table VI-II.

EXAMPLES 22 to 25

There were blended and premixed normal Portland cement, alumina cement (tradename DENKA Alumina Cement No. 1 manufactured by Denki Kagaku Kogyo Kabushiki Kaisya, Japan), phenol resin precursor (tradename Shonol BRS-330 manufactured by Showa Highpolymer Co., Ltd., Japan, with 60.6% of nonvolatile component included therein and water content of 1.3%), polyamide including amide bonding —CONH— having at least a part of hydrogen substituted by methoxymethyl group (tradename Toresin manufactured by Teikoku Chemical Industries Co., Ltd., Japan), glycerol and silane coupling agent (tradename KBE-903 manufactured by Shin-Etsu Chemical Co., Ltd., Japan) in a mortar mixer for two minutes. Thereafter, they were mixed for four minutes in a roller mill for rubber having a revolution ratio of a pair of rollers of 1 to 1.2.

Dough mixture which was wound on the rollers of the roller mill was removed from the rollers to form sheet-like molding materials of about 2 mm thickness. The sheet-like molding materials were compressively molded in a die of 80° C. under compression stress of 6N/mm$^2$ and heated at a temperature of 200° C. for 15 hours to form sheet-like mold goods.

The sheet-like mold good was divided into 10 pieces of 25 mm width and 100 mm length, which were provided for tests identical to those in Examples 19 and 20.

The composition of Examples 19 and 20 are indicated in Table VII-I and the results of the tests are shown in Table VII-II. The tested pieces were subject to X-ray diffraction in which there were found no peak in cement hydrate.

TABLE VII-I

|  | Ex 22 | Ex 23 | Ex 24 | Ex 25 |
| --- | --- | --- | --- | --- |
|  | Composition | | | |
| normal Portland cement | 100 | 60 | — | — |
| alumina cement | — | 40 | 100 | 100 |
| phenol resin precursor | 18.4 | 19.3 | 21.2 | 21.2 |
| polyamide | 1.6 | 1.7 | 1.8 | 1.8 |
| glycerol | 2.0 | 2.2 | 2.3 | 2.3 |
| coupling agent | — | — | — | 2.3 |

TABLE VII-II

|  | Ex 22 | Ex 23 | Ex 24 | Ex 25 |
| --- | --- | --- | --- | --- |
| flexural strength (N/mm$^2$) | | | | |
| before immersion in water | 104 | 165 | 191 | 204 |
| after immersion in water | 70.5 | 156 | 212 | 208 |
| flexural elastic modulus (kN/mm$^2$) | | | | |
| before immersion in water | 45.4 | 47.8 | 38.5 | 39.3 |
| after immersion in water | 40.7 | 44.9 | 34.5 | 35.1 |
| water absorption rate after immersion in water % | | | | |
|  | 1.57 | 0.34 | 0.16 | 0.15 |

EXAMPLES 26 to 29

There were blended and mixed in addition to components in Example 23 melamine resin precursor (manufactured by Mitsui Toatsu Chemicals, Inc., Japan having 74.6% of nonvolatile component included therein and water content of 4.3%) in the form of alcohol solution as the formaldehyde resin precursor and polyacrylamide as the additive in such composition as shown in Table VIII-I. After the components were premixed in a bench type kneader for two minutes, they were mixed for four minutes in a roller mill for rubber having a revolution ratio of a pair of rollers of 1 to 1.2.

Dough mixture which was wound on the rollers of the roller mill was removed from the rollers to form sheet-like molding materials of about 3 mm thickness. The sheet-like molding materials were rolled several times through a roll mill having a revolution ratio of 1 to 1 until it had a thickness of about 1.5 mm and heated at a temperature of 200° C. for 15 hours to form sheet-like mold goods. The sheet-like mold good was divided into 10 pieces of 25 mm width and 100 mm length, which were provided for tests identical to those in Examples 19 and 20.

The composition of Examples 26 to 29 are indicated in Table VIII-I and the results of the tests are shown in Table VIII-II.

TABLE VIII-I

| | Ex 26 | Ex 27 | Ex 28 | Ex 29 |
|---|---|---|---|---|
| | Composition | | | |
| normal Portland cement | 100 | — | — | — |
| alumina cement | — | 100 | 100 | 100 |
| phenol resin precursor | 30.0 | 21.2 | 21.2 | — |
| melamine resin precursor | — | — | — | 18.0 |
| polyamide | — | 1.6 | — | 4.0 |
| polyacrylamide | — | — | 1.6 | — |
| glycerol | 3.0 | 2.3 | 2.3 | 4.0 |

TABLE VIII-II

| | Ex 26 | Ex 27 | Ex 28 | Ex 29 |
|---|---|---|---|---|
| | flexural rigidity (N/mm$^2$) | | | |
| before immersion in water | 71.1 | 112 | 125 | 33.5 |
| after immersion in water | 64.0 | 126 | 103 | not measured |
| | flexural elastic modulus (kN/mm$^2$) | | | |
| before immersion in water | 28.4 | 32.8 | 32.7 | not measured |
| after immersion in water | 27.1 | 30.5 | 28.4 | not measured |
| | water absorption rate after immersion in water % | | | |
| | 2.16 | 0.42 | 0.63 | not measured |

EXAMPLE 30 and COMPARISON 3

The mold goods of Example 27 were heated at a temperature of 300° c. for six hours and provided for bending tests to determine thermal resistance. In comparison, mold goods of about 4 mm thickness having high flexural strength that are commercially available from a certain Japanese Company were divided into pieces of 25 mm width and 75 mm length, heated at the same temperature for the same time and provided for bending tests.

Table IX shows flexural strength of the tests.

TABLE IX

| | Ex 30 | COMPARISON 3 |
|---|---|---|
| | flexural strength (N/mm$^2$) | |
| before heated | 112 | 136 |
| after heated | 106 | 32.4 |

It will be noted that the mold goods of Examples 19 to 30 had higher flexural strength and elastic modulus, and better thermal resistance and water resistance in comparison with the mold goods of Comparisons 3.

This invention further provides a concrete member having a concrete body and reinforcing body disposed on a surface of the concrete body or in the concrete body. The reinforcing body comprises at least one hydraulic cement, a polymer precursor such as formaldehyde precursor or polyimide precursor that is substantially anhydrous and generates water by a curing reaction, and an additive and/or filler, if necessary.

The reinforcing body may be disposed on or in the concrete body by various methods such as a burying method or permanent mold method, which will be described in detail.

The hydraulic cement used in the reinforcing body of the invention may be conventional cement such as Portland cement, blended cement, special cement and various gypsum which may be identical to those used in the cement composite material or molding materials of the invention described with reference to Examples 1 to 30. One or more kinds of hydraulic cement can be used.

The polymer precursor is preferably formaldehyde resin precursor, but it may be polyimide precursor.

The formaldehyde resin precursor used for the reinforcing body of the invention may be phenol resin precursor, melamine resin precursor or urea resin precursor, having substantially no water, but adapted to generate water by heating and curing.

The formaldehyde resin precursor used for the reinforcing body of the invention is alcohol-soluble and it is used in an alcohol solution. Alcohol which is used in the reinforcing body of this invention may be methanol, ethanol, propanol, butanol, cyclohexanol, phenol, cresol, ethylene glycol, trimethylene glycol or the like.

The formaldehyde resin precursor for the reinforcing body of the invention is blended with hydraulic cement in accordance with moldability and other properties of the reinforcing body. In general, a blend ratio of formaldehyde resin precursor may be 5 to 100 weight parts (excluding alcohol) to 100 weight parts of hydraulic cement. If the blend ratio of formaldehyde resin precursor is less than 5 weight parts, then the blended condition of the components will be made worse and the reinforcing body has defects. If it is more than 100 weight parts, the reinforcing body disadvantageously has cracks produced therein and physical strength is not optimized.

The reinforcing body of the invention is preferably blended with an additive of polymer having acid amide bonding such as polyamide or polyacryl, for example, in order to improve the properties of the reinforcing body.

In general, a blend ratio of the additive may be 0.5 to 30 weight parts and preferably 2 to 20 weight parts relative to 100 weight parts of formaldehyde resin precursor. If it is less than 0.5 weight parts, then there will appear no improvement in the properties of the reinforcing body while if it is more than 30 weight parts, there will be no economical improvement in the properties of the reinforcing body (in the same manner as the cement and the mold goods of the invention described with respect to Examples 1 to 30).

The reinforcing body of the invention may be blended with other additive such as conventional lubricant, silane coupling agent or coloring agent in addition to the aforementioned polyamide. Lubricant may be glycerol, glycerol triacetate, phthalic anhydride, furfural, alkyl phenol, zinc stearate, magnesium stearate, rosin or the like. The silane coupling agent may be γ-aminopropyl triethoxysilane, γ-ureidopropyl-triethoxysilane or γ-grycidoxypropyl triethoxysilane. The coloring agent may be formed of organic or inorganic pigment such as aniline black, carbon black or titanium oxide. It will be noted that these additives are identical to those used in the cement and the molding materials of the invention with respect to Examples 1 to 30.

Furthermore, the reinforcing body of the invention may be blended with conventional filler such as wood flour, pulp, cotton flock, stone dust, ground calcium carbonate, aluminium hydroxide, sand, light-weight aggregate, glass fibers, carbon fibers or the like, which are also identical to those used in the cement and the molding materials with respect to Examples 1 to 30.

Formaldehyde resin precursor, hydraulic cement and additive and/or filler, if necessary, are mixed in the form of powder, paste or sheet in a mortar mixer, a blender, a kneader or a hot roller machine.

Thereafter, they are molded to a predetermined shape and heated and cured. The mixture is dried, ground and classified to form material for the reinforcing body, which may be molded by compression molding, extrusion molding or injection molding. A heating temperature may be 100° to 300° C. and preferably 150° to 250° C.

A method of manufacturing a concrete member of the invention will be described with reference to the accompanying drawings.

Figure 1:
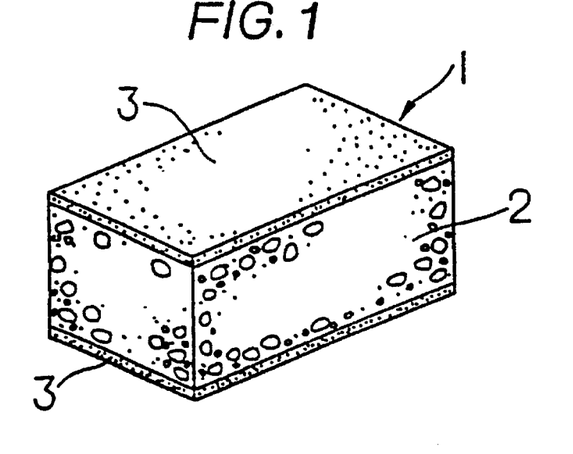
FIG. 1 is a perspective view of a concrete member constructed in accordance with one embodiment of the invention.

As shown in FIG. 1, a concrete member 1 constructed in accordance with one embodiment of the invention comprises a concrete body 2 and two reinforcing bodies 3 integrally mounted on both surfaces of the concrete body 2. It should be noted that only one reinforcing product 3 may be mounted on one of the surfaces of the concrete body 2. The reinforcing body or bodies are of such a construction as aforementioned.

Figure 2:
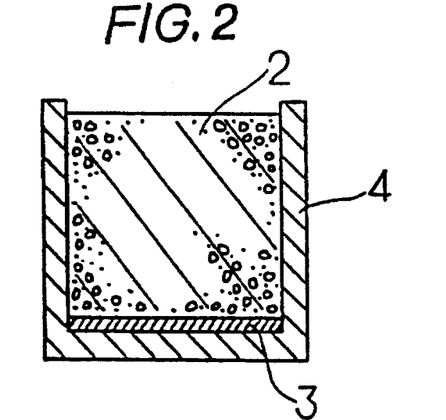
FIG. 2 is a cross sectional view of a concrete member together with a mold in which the concrete member is formed in accordance with one method of the invention.

As shown in FIG. 2, the reinforcing body 3 may be placed on an inner bottom of a mold 4 and freshly mixed concrete may be placed into the mold 4 and cured to form the concrete body 2 integrally associated with the reinforcing body 3.

Figure 3:
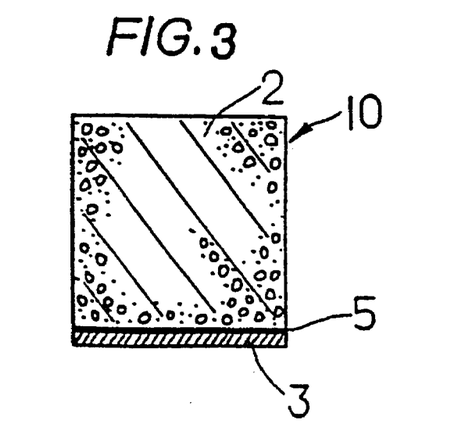
FIG. 3 is a cross sectional view of a concrete member constructed in accordance with another embodiment of the invention.

As shown in FIG. 3, the reinforcing body 3 may be adhered by adhesive agent 5 to the surface of the concrete body 2 which is previously formed by a mold into which freshly mixed concrete is placed.

Figure 4:
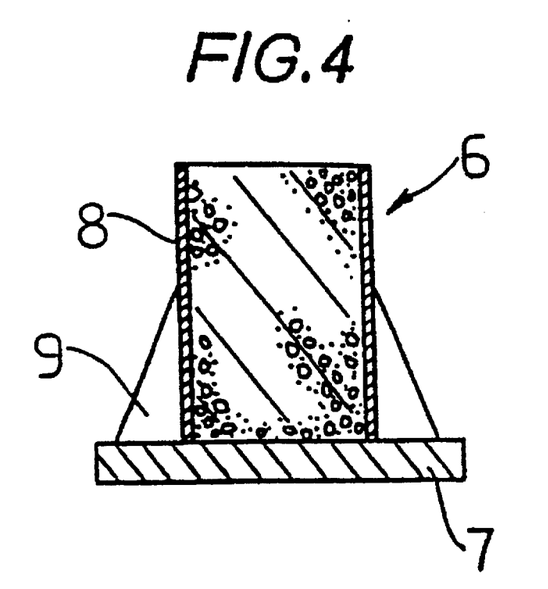
FIG. 4 is a cross sectional view of a concrete member together with a permanent mold in which the concrete member is integrally formed in accordance with another method of the invention.

As shown in FIG. 4, the concrete body 2 may be molded in a permanent mold 6 into which freshly mixed concrete is placed. The permanent mold 6 is formed of a plate-like mold portion 7 of wood or metal and a box-like mold portion 8 of the reinforcing body which may be produced in the same manner as the reinforcing body 3.

After the concrete body 2 is formed, only the plate-like mold portion 7 is removed out of the concrete body 2. The box-like mold portion 8 of reinforcing body is integrally mounted on the cured concrete body 2. In order to support the box-like mold portion 8 on the plate-like mold portion 7, there may be provided supporting members 9 which serve to prevent the box-like mold portion 8 from falling due to pressure from freshly mixed concrete being placed into the permanent mold 6.

Figure 5:
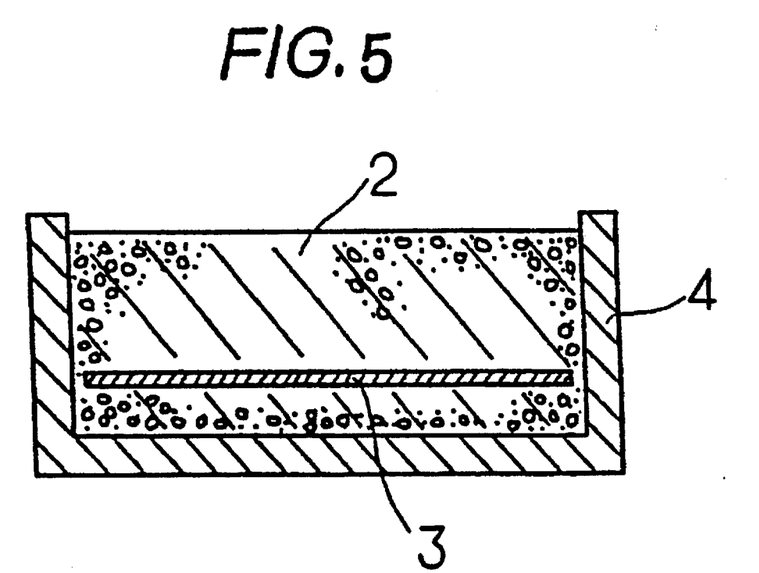
FIG. 5 is a cross sectional view of a concrete member together with a mold in which the concrete member is formed in accordance with a further method of the invention.

Alternatively, as shown in FIG. 5, the reinforcing product 3 is placed in the mold 4 so that the reinforcing product 3 is spaced from the inner bottom of the mold 4 by a spacer not shown. Thus, it will be noted that the concrete body 2 has the reinforcing body 3 integrally disposed therein.

The reinforcing body used for the concrete member of the invention may have no surface treatment, but it preferably has roughness provided on the surface thereof on which the concrete body is provided.

Alternately, it may have adhesive agent of epoxy resin, unsaturated polyester resin or the like provided on the surface thereof on which the concrete body is mounted or a coat layer formed on the surface thereof by coating styrene-butadiene copolymer, acrylonitrile-butadienecopolymer, ethylene-vinylacetate copolymer and the like in the form of latex or emulsion before freshly mixed concrete is placed.

Freshly mixed concrete to be placed may be normal concrete, light-weight concrete, high strength concrete, resin concrete or mortar thereof, but it is not limited to particular concrete.

Furthermore, the concrete member of the invention may have conventional reinforcing bars disposed therein together with the reinforcing body of the invention.

Some examples of the concrete member of the invention will now be described.

EXAMPLE 31

There were blended and premixed 100 weight parts of alumina cement (tradename DENKA Alumina Cement No. 1 manufactured by Denki Kagaku Kogyo Kabushiki Kaisya, Japan), 21.6 weight parts of phenol resin precursor (tradename Shonol BRS-330 having nonvolatile component of 60.6% manufactured by Showa Highpolymer Co., Ltd., Japan), 1.4 weight parts of N-methxymethyl polyamide having hydrogen of amide bonding substituted by methxymethyl group by 30% (tradename Toresin manufactured by Teikoku Chemical Industries Ltd., Japan) and 2.3 weight parts of glycerol in a mortar mixer for two minutes.

Thereafter, they were mixed in a roller mill for rubber having a revolution ratio of 1 to 1.3 for four minutes. Dough mixture which was wound on the rollers of the roller mill was removed from the rollers.

Thereafter, it passed several times through a roller machine having a revolution ratio of 1 to 1 and was reduced to form a sheet-like product of 2 mm thickness, which was heated at a temperature of 200° C. for 18 hours to form a reinforcing product.

As shown in FIG. 2, the reinforcing body of 2 mm thickness, 40 mm width and 160 mm length was placed in the inner bottom of the steel mold of 40 mm thickness, 40 mm width and 160 mm length and thereafter freshly mixed normal concrete shown in Table X was placed into the steel mold.

When 24 hours elapsed after the concrete was placed, the concrete member was protected in a steam atmosphere of 65° C. for four hours to produce the complete concrete member.

The concrete member having an age of 7 days was provided for bending test in accordance with JIS 5201.

As the result of the bending test, the flexural strength of the concrete member was 17.7N/mm² and it was found that it was about 1.9 times of 9.5N/mm² of conventional concrete member formed of only normal concrete produced on the same conditions.

TABLE X

| (Weight Parts) | Normal concrete | Normal Mortar | Light-weight Mortar |
| --- | --- | --- | --- |
| normal Portland cement | 100 | 100 | 100 |
| water | 30 | 30 | 44 |
| naphthol high quality water reduction agent | 2.5 | 2.2 | 1.0 |
| fine aggregate A* | 155 | 180 | — |
| fine aggregate B* | 130 | — | — |
| light-weight aggregate (pearlite) | — | — | 32 |

*Ground sand of less than 5 mm particle diameter
**Ground stone of 5 to 10 mm particle diameter

EXAMPLE 32

Normal concrete having a size of 40 mm×40 mm ×160 mm and composition of Table X was molded and protected and cured in a steam atmosphere of 65° C. for four hours. The normal concrete after an age of 7 days has the reinforcing body of Example 31 adhered by epoxy resin adhesive to a bottom thereof as shown in FIG. 3 to produce a concrete member. After curing the adhesive, the concrete member was provided for bending test in accordance with JIS 5201.

As the result of the bending test, the flexural strength of the concrete member was 16.4N/mm² and it was found that it was about 1.7 times of 9.5N/mm² of conventional concrete member formed of only normal concrete produced on the same conditions.

EXAMPLE 33

As shown in FIG. 4, a box-like mold portion formed of reinforcing body of Example 31 having 2 mm thickness, 40 mm width and 160 mm length was supported by the supporting member on the steel plate and partitioned at its end by plywood to form a permanent mold. In this permanent mold was placed normal mortar of Table X, which was protected in a steam atmosphere of 65° C. for 24 hours to produce a concrete member of 15 mm thickness, 40 mm width and 160 mm length having the reinforcing body integrally associated therewith. The concrete member after an age of 7 days was provided for bending test in accordance with JIS 5201.

As the result of the bending test, the flexural strength of the concrete member was 45.4N/mm² and it was found that it was about 3.3 times of 13.6N/mm² of conventional member formed of only normal mortar produced on the same conditions.

EXAMPLE 34

The concrete member was produced and tested in the same manner as in Example 32, except for light-weight mortar used as material to be placed in place of normal concrete.

As the result of the bending test, the flexural strength of the concrete member was 17.8N/mm² and it was found that it was about 4.9 times of 3.6N/mm² of conventional member formed of only light-weight mortar produced on the same conditions. The concrete member of Example 34 had specific gravity of 1.69, which means that it was light.

EXAMPLE 35

A concrete member was produced in the same manner as in Example 31 except for the reinforcing body placed in a steel mold as shown in FIG. 5. The reinforcing body was formed by forming therein a circular opening of 10 mm diameter (pitch of 20 mm) before being heated and thereafter being heated. The reinforcing body was supported by the spacer not shown in the steel mold of 15 mm thickness, 200 width and 200 mm length.

In the steel mold was placed normal mortar of Table X, which was protected in a steam atmosphere of 65° C. for four hours when 24 hours lapsed after the mortar was placed to produce the complete concrete member. The concrete member after its age of 7 days was cut into pieces of 40 mm width and 200 mm length and provided for bending tests in accordance with JIS 5201.

As the result of the bending test, the flexural strength of the concrete member was 19.7N/mm² and it was found that it was about 1.5 times of 13.6N/mm² of conventional concrete member formed of only mortar produced on the same conditions.

EXAMPLE 36

A concrete member of 40 mm thickness, 40 mm width and 160 mm length was produced in the same manner as in Example 31. The reinforcing body was dried at a temperature of 80° C. and thereafter was coated with epoxy resin on the surface thereof except for the surface of reinforcing body. After the thus obtained concrete member was immersed in water for one month, the water absorption thereof was measured. After that, it was immersed in a solution of 5% hydrochloric acid and the state of erosion was observed. The conventional concrete member having no reinforcing body of the invention provided therein was tested in the same manner.

As the result of the test, the water absorption of the concrete member of Example 36 was 0.5% and the erosion of the surface thereof was not found after it was immersed in the solution of 5% hydrochloric acid. On the other hand, the conventional concrete member formed of only concrete produced on the same conditions had water absorption of 3.4% and the paste of the conventional member was corroded after it was immersed in a solution of 5% hydrochloric acid. The conventional concrete member had the rough surface provided thereon.

As noted from Examples 31 to 36, the concrete member of the invention had higher flexural strength and as a result the reduced cross section and the light weight thereof were obtained. In addition thereto, it had durabilities such as water tightness, chemical resistance and weather resistance or salt damage resistance.

The concrete member of the invention can be applied to materials for a construction field such as footing, pillar, beam, floor materials, external wall materials, interior finishing material, materials for civil engineering field such as canal, bridge, paving material, tunnel, tank and railing tie, materials for machinery field such as a base for machine tool, press die or the like.

Although some embodiments of the invention have been described and illustrated with and without reference to the accompanying drawings, it will be understood by those skilled in the art that they are by way of examples, and that various changes and modifications may be made without departing from the spirit and scope of the invention.

What is claimed:

1. A concrete member comprising a concrete body and at least one reinforcing body integrally associated with said concrete body, said reinforcing body comprising a cement composition having at least one kind of hydraulic cement and a polymer precursor that is substantially anhydrous and generates water by curing reaction, wherein said cement composition has from 12 to 60 parts by weight of said polymer precursor relative to 100 parts by weight of said hydraulic cement and wherein said cement composition is reactable in the absence of additional water.

2. A concrete member as set forth in claim 1 wherein said polymer precursor is formaldehyde resin precursor.

3. A concrete member as set forth in claim 2 wherein said reinforcing body is attached to said concrete body.

4. A concrete member as set forth in claim 2 wherein said reinforcing body is disposed in said concrete body.

5. A concrete member as set forth in claim 2 further comprising an additive of at least polymer having acid-amide bonding included therein.

6. A concrete member as set forth in claim 5, wherein said additive comprises from 0.5 to 30 parts by weight relative to 100 parts by weight of said polymer precursor.

7. A concrete member as set forth in claim 5, wherein said additive comprises from 2 to 20 parts by weight relative to 100 parts by weight of said polymer precursor.

* * * * *